US 11,187,778 B2

(12) United States Patent
Avitzour

(10) Patent No.: US 11,187,778 B2
(45) Date of Patent: Nov. 30, 2021

(54) METHOD AND SYSTEM FOR RADIOLOCATION

(71) Applicant: Hoopo Systems Ltd., Ramat-HaSharon (IL)

(72) Inventor: Daniel Avitzour, Jerusalem (IL)

(73) Assignee: Hoopo Systems Ltd., Glil-Yam (IL)

( * ) Notice: Subject to any disclaimer, the term of this patent is extended or adjusted under 35 U.S.C. 154(b) by 351 days.

(21) Appl. No.: 16/069,547

(22) PCT Filed: Jan. 12, 2017

(86) PCT No.: PCT/IL2017/050040
§ 371 (c)(1),
(2) Date: Jul. 12, 2018

(87) PCT Pub. No.: WO2017/122206
PCT Pub. Date: Jul. 20, 2017

(65) Prior Publication Data
US 2019/0011526 A1 Jan. 10, 2019

Related U.S. Application Data

(60) Provisional application No. 62/277,997, filed on Jan. 13, 2016.

(51) Int. Cl.
*G01S 3/02* (2006.01)
*G01S 5/06* (2006.01)
(Continued)

(52) U.S. Cl.
CPC .............. *G01S 5/06* (2013.01); *G01S 5/04* (2013.01); *G01S 1/0428* (2019.08);
(Continued)

(58) Field of Classification Search
CPC ........ G01S 5/06; G01S 5/0036; G01S 5/0081; G01S 5/0221; G01S 5/04; G01S 19/01
(Continued)

(56) References Cited

U.S. PATENT DOCUMENTS 6,018,312 A * 1/2000 Haworth ................. G01S 1/026
342/353
6,618,009 B2 * 9/2003 Griffin .................... G01S 1/045
342/432

(Continued)

FOREIGN PATENT DOCUMENTS

| WO | WO 97/11383 | 3/1997 |
| WO | WO 01/053848 | 7/2001 |
| WO | WO 2017/122206 | 7/2017 |

OTHER PUBLICATIONS

International Preliminary Report on Patentability dated Jul. 26, 2018 International Bureau of WIPO Re. Application No. PCT/IL2017/050041. (10 Pages).

(Continued)

*Primary Examiner* — Chuong P Nguyen

(57) ABSTRACT

A system for estimating a location of a source transmitting a spectral-diversity signal having a known form but at least one unknown parameter is disclosed. The system comprises signal receiving circuits, each receiving the spectral-diversity signal and computing, for each signal carrier component in the spectral-diversity signal, a cross-ambiguity function based on the known form and on the received spectral-diversity signal. A central processor circuit estimates the location of the source, by calculating an extremum of an objective function constructed from all the cross-ambiguity functions.

20 Claims, 2 Drawing Sheets

(51) Int. Cl.
*G01S 5/04* (2006.01)
*G01S 1/04* (2006.01)
*G01S 5/02* (2010.01)
*G01S 5/00* (2006.01)

(52) U.S. Cl.
CPC .......... *G01S 5/0036* (2013.01); *G01S 5/0081* (2013.01); *G01S 5/0221* (2013.01)

(58) Field of Classification Search
USPC .................................................. 342/451, 463
See application file for complete search history.

(56) References Cited

U.S. PATENT DOCUMENTS

| | | | | |
|---|---|---|---|---|
| 6,665,332 | B1* | 12/2003 | Carlson | G01S 5/0221 375/130 |
| 6,677,893 | B2* | 1/2004 | Rideout | G01S 5/06 342/353 |
| 7,911,385 | B2* | 3/2011 | Heuser | G01S 5/0273 342/465 |
| 8,081,111 | B2* | 12/2011 | Haworth | H04K 3/90 342/451 |
| 8,130,141 | B2* | 3/2012 | Pattabiraman | G01S 19/11 342/357.29 |
| 8,405,323 | B2* | 3/2013 | Finney | H05B 47/155 315/312 |
| 8,471,766 | B2* | 6/2013 | Parker | G01S 5/16 342/378 |
| 8,866,672 | B2* | 10/2014 | Stroud | G01S 5/0081 342/378 |
| 9,119,165 | B2* | 8/2015 | Krasner | H04W 64/00 |
| 10,545,216 | B2* | 1/2020 | Avitzour | G01S 5/12 |
| 10,578,704 | B1* | 3/2020 | Fernandez | G01S 5/06 |
| 2006/0014545 | A1* | 1/2006 | Mo | H04W 64/00 455/456.1 |
| 2007/0080852 | A1 | 4/2007 | Blumke et al. | |
| 2009/0051624 | A1 | 2/2009 | Finney et al. | |
| 2010/0073229 | A1 | 3/2010 | Pattabiraman et al. | |
| 2013/0057436 | A1 | 3/2013 | Krasner et al. | |
| 2015/0085899 | A1 | 3/2015 | Raghupathy et al. | |

OTHER PUBLICATIONS

International Search Report and the Written Opinion dated May 22, 2017 From the International Searching Authority Re. Application No. PCT/IL2017/050040. (15 Pages).
Supplementary European Search Report and the European Search Opinon dated Sep. 3, 2019 From the European Patent Office Re. Application No. 17738290.0. (7 Pages).
Communication Pursuant to Article 94(3) EPC dated May 12, 2021 From the European Patent Office Re. Application No. 17738290.0. (6 Pages).
Overfield et al. "Geolocation of MIMO Signals Using the Cross Ambiguity Function and TDOA/FDOA", 2012 IEEE International Conference on Communications, ICC 2012, XP032273695, Ottawa, ON, Canada, Jun. 10-15, 2012, p. 3648-3653, Jun. 10, 2012.
Pourhomayoun et al. "Distributed Computation for Direct Position Determination Emitter Location", IEEE Transactions on Aerospace and Electronic Systems, XP011567373, 50(4): 2878-2889, Oct. 2014.

* cited by examiner

METHOD AND SYSTEM FOR RADIOLOCATION

RELATED APPLICATIONS

This application is a National Phase of PCT Patent Application No. PCT/IL2017/050040 having International filing date of Jan. 12, 2017, which claims the benefit of priority under 35 USC § 119(e) of U.S. Provisional Patent Application No. 62/277,997 filed on Jan. 13, 2016. The contents of the above applications are all incorporated by reference as if fully set forth herein in their entirety.

FIELD AND BACKGROUND OF THE INVENTION

The present invention, in some embodiments thereof, relates to radiolocation and, more particularly, but not exclusively, to a method and system for estimating the location of a source transmitting a spectral-diversity signal.

Mobile communications has changed the way people communicate and mobile phones have been transformed from a luxury item to an essential part of every day life. The use of mobile phones is today dictated by social situations, rather than hampered by location or technology. Aside for voice connections, the mobile Internet continues to filter further into the fabric of everyday life.

Advanced cellular networks have been specifically designed to fulfill demands of the mobile Internet. As these services grow in popularity and usage, factors such as cost efficient optimization of network capacity and quality of service have become desired. These factors may be achieved with careful network planning and operation, improvements in transmission methods, and advances in receiver techniques. In this regard, networks based on wideband code division multiple access (WCDMA) technology make the delivery of data to end users a feasible option.

Locating sources within a wireless communication system enables features such as location-based services and location-aware management. A number of techniques have been proposed for radiolocation. These can be categorized as either direct radiolocation techniques or indirect radiolocation techniques. In the direct radiolocation techniques, also known as Direct Position Determination (DPD) techniques, the location of the source is estimated in one step, directly from the received signals. Indirect radiolocation is done in two stages. In a first stage, signal propagation parameters, such as Received Signal Strength Indication (RSSI), Time of Arrival (TOA) and Time Difference Of Arrival (TDOA) between different receiving stations are estimated. In a second stage, the location is estimated based on the parameters obtained in the first stage.

Some techniques are based on an exact knowledge of the transmitted signal waveform. These techniques are referred to as "known-signal techniques." Other techniques do not utilize such information, and are referred to as "unknown-signal techniques." Generally speaking, known-signal techniques perform better than unknown signal techniques, and direct techniques perform better than indirect techniques.

SUMMARY OF THE INVENTION

According to an aspect of some embodiments of the present invention, there is provided a system for estimating a location of a source transmitting a spectral-diversity signal having a known form but at least one unknown parameter. The system comprises: a plurality of signal receiving circuits, each configured to receive the spectral-diversity signal and to compute, for each signal carrier component in the spectral-diversity signal, a cross-ambiguity function based on the known form and on the received spectral-diversity signal. The system further comprises a central processor circuit configured to receive data pertaining to a plurality of cross-ambiguity functions computed by the signal receiving circuits, and to estimate the location of the source, wherein the estimation comprises calculating an extremum of an objective function constructed from all the cross-ambiguity functions.

According to some embodiments of the invention, the estimation is an indirect estimation, and the central processor circuit is configured to calculate, based on the extremum, Time Difference Of Arrival (TDOA) values between pairs of signal receiving circuits, and to estimate the location based on the TDOA values.

According to some embodiments of the invention, the system comprises a reference source transmitting a reference spectral-diversity signal, wherein each signal receiving circuit is configured to compute a cross-ambiguity function corresponding to signal carrier components in the reference spectral-diversity signal, and wherein the central processor circuit is configured to correct a timing offset among the signal receiving circuits based on the cross-ambiguity function.

According to some embodiments of the invention for each pair of signal receiving circuits, the objective function comprises a matrix having an entry for each of cross-ambiguity function as computed by each signal receiving circuit of the pair.

According to some embodiments of the invention, the estimation is a direct estimation, and the central processor circuit is configured to estimate the location directly from the extremum.

According to some embodiments of the invention, the central processor circuit is configured to access a database storing a digital terrain map describing height data of sources and to extract from the map a height of the source, and wherein the estimation based on the extremum is executed in two spatial dimensions and combined with the extracted height.

According to an aspect of some embodiments of the present invention, there is provided a method of estimating a location of a source transmitting a spectral-diversity signal having a known form but at least one unknown parameter. The method comprises: receiving the spectral-diversity signal by a plurality of signal receiving circuits; computing, for each signal carrier component of the spectral-diversity signal and each signal receiving circuit, a cross-ambiguity function based on the known form and on the received signal carrier component. According to some embodiments of the invention, the method comprises estimating the location of the source, wherein the estimation comprises calculating an extremum of an objective function constructed from all the cross-ambiguity functions.

According to some embodiments of the invention, the estimation is an indirect estimation, which comprises calculating, based on the extremum, TDOA values between pairs of signal receiving circuits, and estimating the location based on the TDOA values.

According to some embodiments of the invention, the method comprises transmitting a reference spectral-diversity signal, computing a cross-ambiguity function corresponding to signal carrier components in the reference spectral-diversity signal, and correcting a timing offset among the signal receiving circuits based on the cross-ambiguity function.

According to some embodiments of the invention, the method comprises accessing a database storing a digital terrain map describing height data of sources and extracting from the map a height of the source, wherein the estimation based on the extremum is executed in two spatial dimensions and combined with the extracted height.

According to some embodiments of the invention for each pair of signal receiving circuits, the objective function comprises a multiplication of N by 2 matrices, each being constructed from a first plurality of cross-ambiguity functions corresponding to a first signal receiving circuit of the pair and a second plurality of cross-ambiguity functions corresponding to a second signal receiving circuit of the pair, wherein the N is a number of the signal carrier components.

According to some embodiments of the invention, the estimation is executed directly from the extremum.

According to some embodiments of the invention, the objective function comprises a multiplication of N by K matrices, each being constructed from K pluralities of cross-ambiguity functions respectively corresponding to K signal receiving circuits, wherein the N is a number of the signal carrier components.

According to some embodiments of the invention, the unknown parameter(s) comprises a phase of each signal carrier component.

According to some embodiments of the invention, the unknown parameter(s) comprises amplitude of each signal carrier component.

According to some embodiments of the invention, the unknown parameter(s) comprises a clock drift characterizing the source.

According to some embodiments of the invention, the unknown parameter comprise a phase of each signal carrier component, amplitude of each signal carrier component, and at least one additional parameter other than the phase and the amplitude.

According to some embodiments of the invention, the known form comprises a linear chirp form.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system.

In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
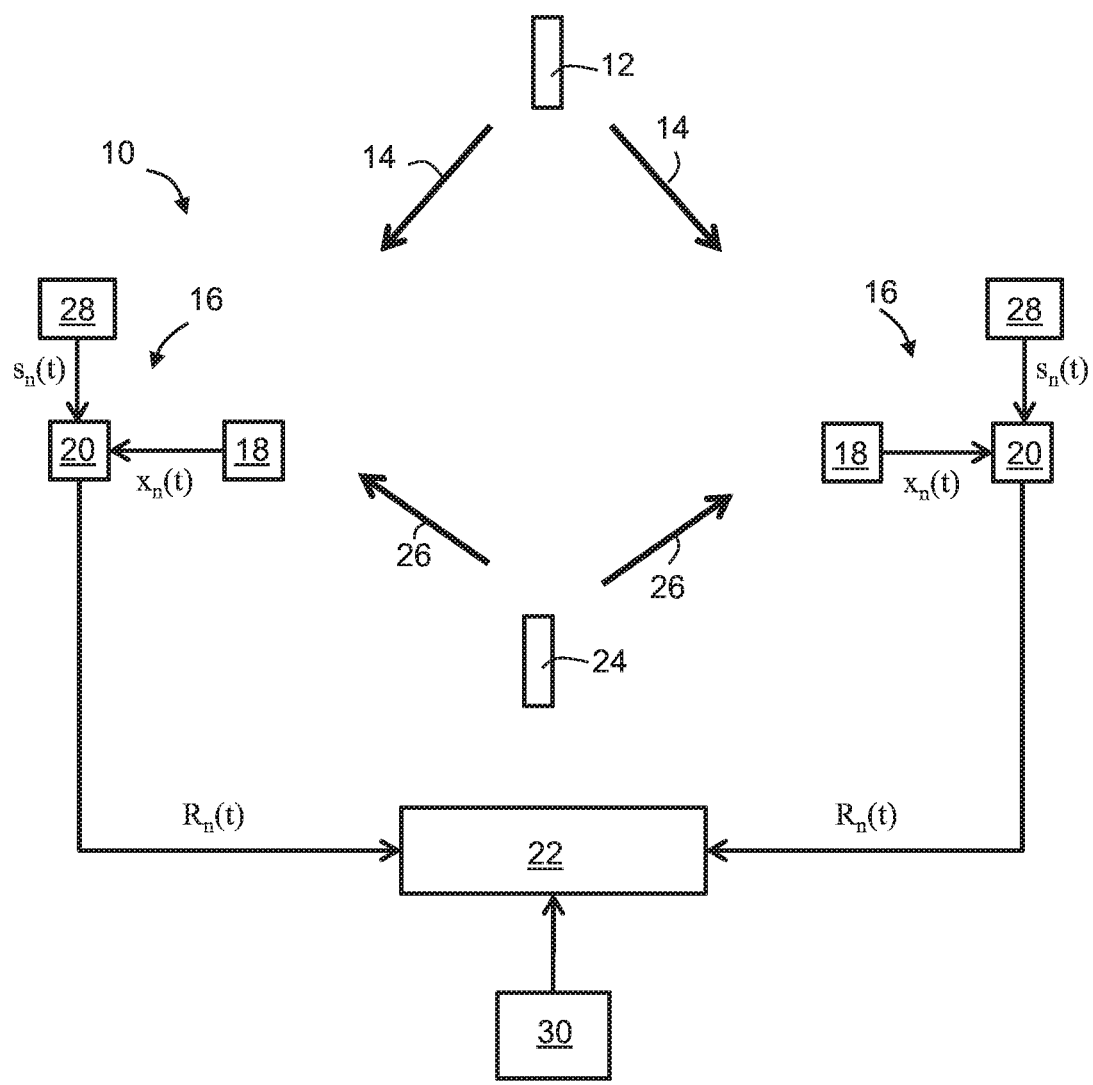
FIG. 1 is a schematic illustration of a system suitable for estimating a location of a source transmitting a spectral-diversity signal, according to some embodiments of the present invention.

The present invention, in some embodiments thereof, relates to radiolocation and, more particularly, but not exclusively, to a method and system for estimating the location of a source transmitting a spectral-diversity signal.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1 which is a schematic illustration of a system 10 suitable for estimating a location of a source 12 transmitting a spectral-diversity signal 14. Source 12 is optionally and preferably static, but embodiments in which source 12 is mobile are also contemplated. The signal 14 is shown as two arrows in FIG. 1 to illustrate that it propagates in space (for example, along a spherical wave-front).

As used herein, a "spectral-diversity signal" refers to a signal having a set of signal carrier components each carried by a different carrier, wherein the carrier frequencies vary among different signal carrier components in the set according to a predetermined time-frequency schedule.

Typically, the time-frequency schedule does not specify absolute times and frequencies, but only differences between times and differences between frequencies. Nevertheless, embodiments in which the time-frequency schedule includes absolute times and frequencies are also contemplated.

Representative examples of spectral-diversity signals suitable for the present embodiments include, without limitation, the, GSM standard, the standard offered by an alliance named LoRa™ and the standard offered by the SIGFOX company.

Other examples include, without limitation, signals of Wireless Local Access Network (WLAN), such as, but not limited to, IEEE 802.11, IEEE 802.11a-g, IEEE 802.15.4, and derivatives thereof.

Spectral-diversity signals are employed extensively in various communication systems. In such systems, each signal carrier component in the set typically has a narrow bandwidth for a relatively short time. However, the collection of carrier frequencies employed by the signals form an effective bandwidth that is relatively wide, and that in any event is wider than the bandwidth of each individual signal in the set.

Typical bandwidth values of each signal carrier component of a spectral-diversity signal is from about 10 kHz to about 500 kHz. The effective bandwidth spanned by the collection of carrier frequencies employed by the spectral-diversity signal typically extend from about 1 MHz to about 30 MHz.

A typical duration of each signal carrier component of a spectral-diversity signal is from about 1 msec to about 500 msec. The overall duration of a spectral-diversity signal is typically at least 1 second or at least 5 seconds. In some embodiments the spectral-diversity signal is transmitted continuously.

It was realized by the present Inventor that such a wide effective bandwidth can be used for improving the accuracy of source localization. This is because the accuracy of location increases with the bandwidth. The present Inventor found that even though a set of spectral-diversity signals may in some cases define a sparse spectrum, namely a spectrum that is not continuous and that may be devoid of some frequencies, this is sufficient for improving the accuracy of radiolocation.

The signal carrier components in the set 14 typically have a known baseband form denoted herein by $s_n(t)$, n=1, 2, ..., N, where N is the number of different signal carrier components in the set 14. Without loss of generality and to ensure correctness of the equations in this description, it is assumed that for each n $$\int |s_n(t)|^2 dt = 1 \qquad \text{(EQ. 1)}$$

where integral taken over the duration of the nth signal.

Also contemplated are embodiments in which one or more parameters of the signal $s_n(t)$ are unknown. For example, a case where the signal carrier components $s_n(t)$ are linear frequency modulated (chirps) but the exact rate of change in a chirp is not known. Another example is a case in which the clock rate of the transmitter has an unknown drift compared with the clock rate of the receiver.

The radiofrequency signals that are actually transmitted by source 12 based on the baseband forms $s_n(t)$ have amplitude and phase which are not necessarily the same for different signal carrier components and are typically unknown to system 10. For example, in some embodiments of the present invention the phase of each signal carrier component is unknown, in some embodiments of the present invention the amplitude of each signal carrier component is unknown, and in some embodiments of the present invention both the phase and the amplitude of each signal carrier component are unknown.

In a representative exemplary embodiment, signal $s_n(t)$ has a chirp form, such as, a linear chirp form.

System 10 typically comprises a plurality of signal receiving circuits 16, each configured to receive the diversity signals 14 and to responsively generate a representation of at least a portion of these signals. Signal receiving circuits 16 are optionally and preferably static, but embodiments in which there is a relative motion of circuits 16 relative to source 12 are also contemplated. Two signal receiving circuits are illustrated in FIG. 1, but it is to be understood that the present embodiments contemplate any number of signal receiving circuits. The signal receiving circuits may be physically separate receivers, or receivers tuned to different carrier frequencies at different times, or they may be implemented as a single wideband receiver followed by appropriate digital processing.

Preferably, each of signal receiving circuits 16 generates a signal representation for each of the signal carrier components it receives from source 12. The representations generated by circuits 16 are denoted herein by $x_n(t)$, n=1, 2, ..., N, where N is the number of different representations. When signal receiving circuits 16 generate a signal representation for each of the signal carrier components it receives from source 12, the number of representations N is the same as the number of different signal carrier components in the set 14. Typically, each representation $x_n(t)$ is a complex signal representation, for example, a complex representation having in-phase component and a quadrature component.

One or more (e.g., each) of signal receiving circuits 16 can comprise a representation generating circuit 18 that generates the representation $x_n(t)$, and a digital signal processing circuit 20 that process the representation as further detailed hereinbelow.

Representation generating circuit 18 can generate $x_n(t)$ in more than one way. In some embodiments of the present invention circuit 18 is embodied as a wideband receiver that is sensitive to all the signal carrier components in the set. For example, when all the signals occupy parts of a 20 MHz band, then a 20 MHz wideband receiver may be used. In these embodiments, circuit 18 employs an analog to digital converter (ADC) that digitizes the received diversity signal according to a predetermined sampling rate (e.g., 20 Msamples/sec in-phase and 20 Msamples/sec quadrature for a 20 MHz receiver), and a digital filter bank circuit having a plurality of digital filters each being characterized by a predetermined and different frequency band. The digital filter bank receives the digitized diversity signal and separates it to a plurality of digital representation signals, each being characterized by the frequency band of the respective filter of the bank. The digital filter bank circuit can employ a Fourier transform [e.g., fast Fourier transform (FFT)] and may optionally employ a weighted overlap-add (WOLA) procedure.

In some embodiments of the present invention circuit 18 is embodied as a plurality of receivers, each being sensitive to a different signal carrier component of the set. The bandwidth of receiver preferably matches the expected bandwidth of the signal carrier components, e.g., a bandwidth of about 250 kHz when each signal carrier component occupies a 250 kHz band. In these embodiments, each received signal is transferred to a separate ADC that that digitizes the received signal carrier component according to a predetermined sampling rate (e.g., about 250 ksamples/sec in-phase and 250 ksamples/sec quadrature for the aforementioned example).

Signal processing circuits 20 preferably comprise, or are in communication with, a memory medium 28 that stores the forms $s_n(t)$. In various exemplary embodiments of the invention signal processing circuit 20 computes, for each signal carrier component, a cross-ambiguity function $R_n$ based on the known form $s_n(t)$ provided by memory medium 28 and on the received signal carrier component (more preferably the representation $x_n$ provided by circuit 18). The cross-ambiguity function $R_n$ is typically a time-frequency cross-correlation between $s_n(t)$ and $x_n(t)$. For example, $R_n$ can be defined, for any time delay d and any frequency shift $\Omega$ according to the following equation:

$$R_n(d,\Omega) = \int x_n(t+d)^* s_n(t) \exp(-j\Omega t) dt \quad (EQ.\ 2)$$

where the superscripts symbol * denotes a complex conjugate. EQ. 2 is particularly useful in embodiments in which $s_n(t)$ is known (but the phase and the amplitude of the radiofrequency signal based on it are unknown). When one or more additional parameters $\theta$ of each baseband signal $s_n(t)$ are unknown, the $R_n$ can be defined with the additional unknown parameter as an additional argument, for example, $$R_n(d,\Omega,\theta) = \int x_n(t+d)^* s_n(t,\theta) \exp(-j\Omega t) dt \quad (EQ.\ 3)$$

A representative example of a parameter $\theta$ is a chirp rate of $s_n(t)$. For example when $s_n(t)$ is specified as a linear chirp of known duration T, but with an unknown chirp rate, it may be written as $s_n(t) = \exp(-j\theta t^2/2)$ for $|t| < T/2$.

As explained in greater detail below, the arguments of the function $R_n$ are used as optimization variables.

$R_n$ can be computed by circuit 20 for any value of the variables d and $\Omega$, using samples of $x_n(t)$ and $s_n(t)$. This can be done either directly in the time domain, or indirectly in the frequency domain, for example, using a Fourier Transform or FFT.

System 10 optionally and preferably comprises a central processor circuit 22 that receives from circuits 16 data pertaining to the cross-ambiguity functions $R_n$, and estimates the location of source 12. The data transferred from circuits 16 to central processor circuit 22 can be of any types that allows central processor circuit 22 to obtain the values of the functions $R_n$, for a plurality of sets of variables (e.g., a plurality of sets $\{d, \Omega\}$, or a plurality of sets $\{d, \Omega, \theta\}$).

While the embodiments above have been described with a particular emphasis to a situation on which the optimization variables include d and $\Omega$, this need not necessarily be the case. For example, in some embodiments of the present invention the variable $\Omega$ is either known or can have an arbitrarily fixed value (e.g., $\Omega=0$) for all values of n and for all the circuits 16. In these embodiments, the optimization variable or variables do not include $\Omega$. A representative example of such a situation is when the radio frequencies of the signals are known precisely or when the baseband signal $s_n(t)$ has a linear chirp form, and thus perfect time-frequency ambiguity.

The estimation performed by central processor circuit 22 typically comprises calculating an extremum (maximum or minimum) of an objective function constructed from all the cross-ambiguity functions received from circuits 16. Representative examples of objective functions suitable for the present embodiments are provided hereinbelow. The estimation can be indirect estimation in which case central processor circuit 22 calculates, based on the extremum of the objective function, TDOA values between pairs of signal receiving circuits 16, and then estimates the location based on the calculated TDOA values, for example, by least-squares fitting of the TDOA values to distance differences from source 12 to circuits 16. The estimation can alternatively be a direct estimation, in which case central processor circuit 22 to estimates the location directly from the extremum.

Central processor circuit 22 typically provides the location of the source 12 as a three-dimensional spatial vector $\underline{z}$ consisting, for example of latitude, longitude and altitude values, wherein at least one, or more preferably at least two of the components of this vector are estimated based on the extremum of the objective function. When central processor circuit 22 estimates two components of $\underline{z}$ based on the extremum of the objective function, these components typically span a horizontal plane (e.g., perpendicular to the gravitation direction). In these embodiments, central processor circuit 22 accesses a database storing a digital terrain map describing height data of sources, extracts from the map the third dimension (e.g., height) of the source, and combine the estimated components with the extracted component to form the three-dimensional vector $\underline{z}$. The database storing the digital terrain map can be recorded on a memory medium 30 accessible by circuit 22. When central processor circuit 22 estimates all three components of $\underline{z}$ based on the extremum of the objective function, there is no need to extract a component from a digital terrain map. Use of a digital terrain map is advantageous since it reduces the dimensionality of the variable space.

In some embodiments of the present invention system 10 comprises one or more reference sources 24 transmitting a spectral-diversity signal 26, having a predetermined form. Reference source(s) 24 is optionally and preferably static, but embodiments in which there is a relative motion of source(s) 24 relative to source 12 are also contemplated. The reference spectral-diversity signal 26 need not to have the same form as the known form $s_n(t)$. Source 24 is at a predetermined distance from each of the signal receiving circuits 16 so that the expected propagation time of diversity signal 26 from source 24 to each of circuits 16 can be obtained by dividing the distance between source 24 and the respective circuit 16 by the speed of the signal (typically the speed of light).

Signal receiving circuits 16 receive reference signal 26 and compute cross-ambiguity functions $R_n$ corresponding to reference diversity signal 26, typically in the same manner as described above with respect to signal 14. Thus, for example, circuits 16 can generate a representation (e.g., a complex in-phase and quadrature representation) of the received reference signal and compute a time-frequency cross-correlation between the representation of the received reference signal and the form of the reference signal.

The cross-ambiguity functions $R_n$ of the signal carrier components in the reference spectral-diversity signal set 26, can be used for correcting a timing offset among the signal receiving circuits 16. For example, central processor circuit 22 can estimate TDOA values between pairs of signal receiving circuits 16 based on the reference diversity signal 26, and compare the estimated TDOA values to the difference between the expected propagation times of signals 26 from source 24 to the respective signal receiving circuits 16. The difference between the expected and estimated TDOA values can be used by the processor circuit 22 to time-shift the cross-ambiguity functions received from the signal receiving circuits thus correcting timing offset among the signal receiving circuits.

Figure 2:
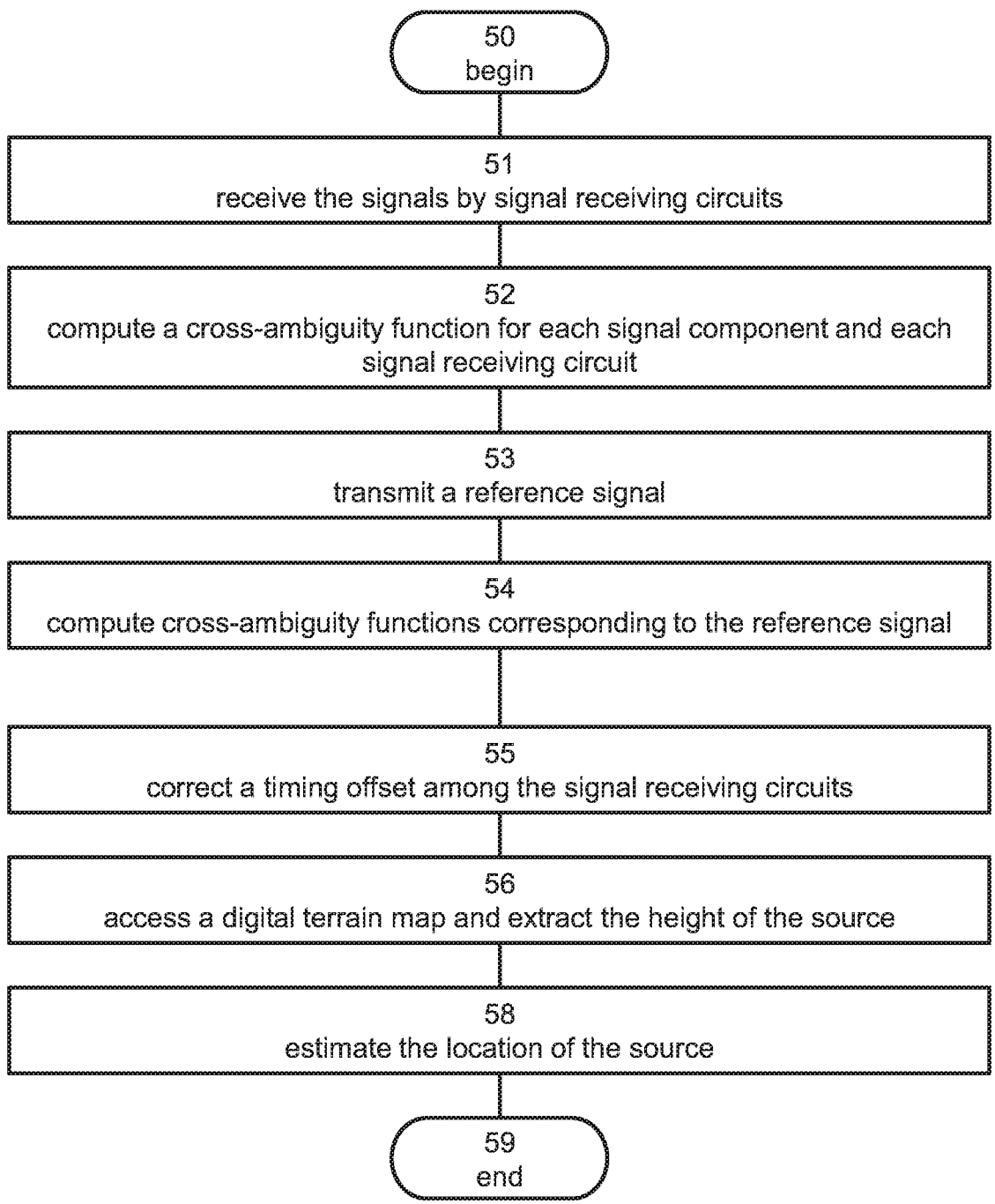
FIG. 2 is a flowchart diagram of a method of estimating a location of a source transmitting diversity signals according to various exemplary embodiments of the present invention.

FIG. 2 is a flowchart diagram of a method of estimating a location of a source (e.g., source 12) transmitting diversity signals (e.g., signals 14) according to some embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 50 and optionally and preferably continues to 51 at which the diversity signals are received by a plurality of signal receiving circuits (e.g., circuits 16). The method can continue to 52 at which a cross-ambiguity function (e.g., the function $R_n$) is computed for each diversity signal and each signal receiving circuit, based on the known form and on the received diversity signal, as further detailed hereinabove. In some embodiments of the present invention, the method proceeds to 53 at which a reference diversity signal (e.g., signal 26) is transmitted, as further detailed hereinabove. In these embodiments, the method can continue to 54 at which a cross-ambiguity function corresponding to the reference diversity signal is computed, and to 55 at which a timing offset among the signal receiving circuits is corrected as further detailed hereinabove.

In some embodiments of the present invention the method continues to 56 at which a database storing a digital terrain map describing height data of sources is accessed for extracting the third component (e.g., height) of the location vector $\underline{z}$ as further detailed hereinabove.

The method can then continue to 58 at which the location of the source is estimated, as further detailed hereinabove.

The method ends at 59.

Following is a description of objective functions suitable for the present embodiments.

When an indirect estimation is employed, the objective function for each pair of signal receiving circuits optionally and preferably comprises a matrix P of dimensions N×2, wherein P has an entry (matrix-element) for each of the functions $R_n$ as computed by each signal receiving circuit of the pair. In any of the embodiments of the invention in which indirect estimation is employed it is preferred that each matrix-element P has a form $\exp(-j\omega_n f(d))R_n$, where $f$ is a function, preferably a linear function, of the time-delay variable d. For example, $f(d)$ can be set to $\pm d/2$. In preferred embodiments, for matrix-elements of P that relate to one signal receiving circuit of the pair the functions $R_n$ are calculated with a positive time-delay variable d, and for matrix-elements of P that relate to the other signal receiving circuit of the pair the functions $R_n$ are calculated with a negative positive time-delay variable d.

A representative example of an expression suitable for a matrix-element corresponding to the kth pair of signal receiving circuits, for the embodiments in which the functions $R_n$ are computed for the sets $\{d, \Omega\}$, is:

$$P(d,\tau,\Omega)_{nl}=\exp(-j\omega_n(-1)^l d/2) \, R_{k(l)n}((-1)^l d/2+\tau, \Omega) \quad \text{(EQ. 4)}$$

where, n=1, 2, ... N and l=1,2, where k(1) and k(2) denote the individual signal receiving circuits of the kth pair, where $R_{k(l)n}$ is the cross-ambiguity function $R_n$ as computed by the k(l)-th signal receiving circuit, and where $\tau$ is a temporal optimization variable.

A representative example of an expression suitable for a matrix-element corresponding to the kth pair of signal receiving circuits, for the embodiments in which $\Omega$ can have an arbitrary value (e.g., when signals 14 have linear chirp form), is:

$$P(d,\tau)_{nl}=\exp(-j\omega_n(-1)^l d/2) \, R_{k(l)n}((-1)^l d/2+\tau). \quad \text{(EQ. 5)}$$

A representative example of an expression suitable for a matrix-element corresponding to the kth pair of signal receiving circuits, for the embodiments in which the functions $R_n$ are computed for the sets $\{d, \Omega, \theta\}$, is:

$$P(d,\tau,\Omega,\theta)_{nl}=\exp(-j\omega_n(-1)^l d/2) \, R_{k(l)n}((-1)^l d/2+\tau,\Omega,\theta). \quad \text{(EQ. 6)}$$

A representative example of an expression suitable for a matrix-element corresponding to the kth pair of signal receiving circuits, for the embodiments in which the functions $R_n$ are computed for the sets $\{d, \theta\}$ (e.g., when signals 14 have linear chirp form), is:

$$P(d,\tau,\Omega,\theta)_{nl}=\exp(-j\omega_n(-1)^l d/2) \, R_{k(l)n}((-1)^l d/2+\tau,\Omega,\theta). \quad \text{(EQ. 7)}$$

A representative example of an expression suitable for a matrix-element corresponding to the kth pair of signal receiving circuits, for the embodiments in which the clock drift characterizing the source is unknown and functions $R_n$ are computed for the sets $\{d, \Omega\}$, is:

$$P(d,\tau,\Omega,\gamma)_{nl}=\exp(-j\omega_n(-1)^l d/2) \, R_{k(l)n}((-1)^l d/2+\tau+\gamma t_n, \Omega) \quad \text{(EQ. 8)}$$

where $\gamma$ is the unknown clock drift and $t_n$ is the center time of the nth diversity signal.

A representative example of an expression suitable for a matrix-element corresponding to the kth pair of signal receiving circuits, for the embodiments in which the clock drift characterizing the source is unknown and $\Omega$ can have an arbitrary value (e.g., when signals 14 have linear or non-linear chirp form), is:

$$P(d,\tau,\gamma)_{nl}=\exp(-j\omega_n(-1)^l d/2) \, R_{k(l)n}((-1)^l d/2+\tau+\gamma t_n) \quad \text{(EQ. 9)}$$

A representative example of an expression suitable for a matrix-element corresponding to the kth pair of signal receiving circuits, for the embodiments in which the clock drift characterizing the source is unknown and functions $R_n$ are computed for the sets $\{d, \Omega, \theta\}$, is:

$$P(d,\tau,\Omega,\gamma)_{nl}=\exp(-j\omega_n(-1)^l d/2) \, R_{k(l)n}((-1)^l d/2+\tau+\gamma t_n, \Omega,\theta). \quad \text{(EQ. 10)}$$

A representative example of an expression suitable for a matrix-element corresponding to the kth pair of signal receiving circuits, for the embodiments in which the clock drift characterizing the source is unknown and functions $R_n$ are computed for the sets $\{d, \theta\}$ (e.g., when signals 14 have linear or non-linear chirp form), is:

$$P(d,\tau,\Omega, \gamma)_{nl}=\exp(-j\omega_n(-1)^l d/2) \, R_{k(l)n}((-1)^l d/2+\tau+\gamma t_n, \theta). \quad \text{(EQ. 11)}$$

The objective function for the kth pair can optionally and preferably be defined as the highest eigenvalue of the multiplication of the matrix P by its Hermitian conjugate $P^H$. Formally, the objective function for the kth pair can be written as:

$$F_k=\|P^H P\| \quad \text{(EQ. 12)}$$

where the notation $\|A\|$ is used to denote the highest eigenvalue. The TDOA of the kth pair can then be estimated as the value of d in the set $\{v\}$ which maximizes $F_k(\{v\})$, where $\{v\}$ denotes the set of optimization variables used to define the matrix P (e.g. sets $\{d, \Omega, \theta\}$).

The calculation of the matrix P and the solution of the optimization problem is preferably repeated for at least a few (e.g., all) the pairs of circuits 16. Thereafter, the location can be estimated based on the calculated TDOA values as further detailed hereinabove.

When a direct estimation is employed, the objective function optionally and preferably comprises a matrix S having an entry for each of the functions $R_n$ as computed by each signal receiving circuit. Thus, the difference between the embodiments in which direct estimation is employed and the embodiments in which indirect estimation is employed, is that when the estimation is indirect, there is a plurality of matrices P, each matrix corresponding to one pair of signal receiving circuit, whereas when the estimation is direct, there is a single matrix S that correspond to more than two signal receiving circuits, more preferably all the signal receiving circuits, of system 10. Thus, the matrix S is preferably an N by K matrix, where K is the number of signal receiving circuits of system 10.

In any of the embodiments of the invention in which direct estimation is employed it is preferred that each matrix-element P has a form $\exp(-j\omega_n D_k(\underline{z}))R_n$, where $D_k(\underline{z})$ is the propagation time of the signal from source 12 to the kth signal receiving circuit, and can be expressed as the (unknown) distance from source 12 to the kth signal receiving circuit divided by the speed of light. When the functions $R_n$ are computed using the time-delay variable d, $D_k(\underline{z})$ is preferably substituted for the time-delay variable d during the location estimation.

A representative example of an expression suitable for a matrix-element of S, for the embodiments in which the functions $R_n$ are computed for the sets $\{d, \Omega\}$, is:

$$S(\underline{z},\tau,\Omega)_{nl}=\exp(-j\omega_n D_k(\underline{z}))\, R_{kn}(D_k(\underline{z})+\tau,\Omega) \quad \text{(EQ. 13)}$$

where $R_{nk}$ is the cross-ambiguity function as computed by the kth signal receiving circuit.

A representative example of an expression suitable for a matrix-element of S, for the embodiments in which $\Omega$ can have an arbitrary value (e.g., when signals 14 have linear or non-linear chirp form), is:

$$S(\underline{z},\tau)_{nl}=\exp(-j\omega_n D_k(\underline{z}))\, R_{kn}(D_k(\underline{z})+\tau). \quad \text{(EQ. 14)}$$

A representative example of an expression suitable for a matrix-element of S, for the embodiments in which the functions $R_n$ are computed for the sets $\{d, \Omega, \theta\}$, is:

$$S(\underline{z},\tau,\Omega,\theta)_{nl}=\exp(-j\omega_n D_k(\underline{z}))\, R_{kn}(D_k(\underline{z})+\tau,\Omega\theta). \quad \text{(EQ. 15)}$$

A representative example of an expression suitable for a matrix-element of S, for the embodiments in which the functions $R_n$ are computed for the sets $\{d, \theta\}$ (e.g., when signals 14 have linear or non-linear chirp form), is:

$$S(\underline{z},\tau,\theta)_{nl}=\exp(-j\omega_n D_k(\underline{z}))\, R_{kn}(D_k(\underline{z})+\tau, \theta). \quad \text{(EQ. 16)}$$

A representative example of an expression suitable for a matrix-element of S, for the embodiments in which the clock drift characterizing the source is unknown and functions $R_n$ are computed for the sets $\{d, \Omega\}$, is:

$$S(\underline{z},\tau, \Omega,\gamma)_{nl}=\exp(-j\omega_n D_k(\underline{z}))\, R_{kn}(D_k(\underline{z})+\tau+\gamma t_n,\Omega). \quad \text{(EQ. 17)}$$

A representative example of an expression suitable for a matrix-element of S, for the embodiments in which the clock drift characterizing the source is unknown and $\Omega$ can have an arbitrary value (e.g., when signals 14 have linear or non-linear chirp form), is:

$$S(\underline{z},\tau,\gamma)_{nl}=\exp(-j\omega_n D_k(\underline{z}))\, R_{kn}(D_k(\underline{z})+\tau+\gamma t_n) \quad \text{(EQ. 18)}$$

A representative example of an expression suitable for a matrix-element of S, for the embodiments in which the clock drift characterizing the source is unknown and functions $R_n$ are computed for the sets $\{d, \Omega, \theta\}$, is:

$$S(\underline{z},\tau,\Omega\gamma)_{nl}=\exp(-j\omega_n D_k(\underline{z}))\, R_{kn}(D_k(\underline{z})+\tau+\gamma t_n,\Omega,\theta). \quad \text{(EQ. 19)}$$

A representative example of an expression suitable for a matrix-element of S, for the embodiments in which the clock drift characterizing the source is unknown and functions $R_n$ are computed for the sets $\{d, \theta\}$ (e.g., when signals 14 have linear or non-linear chirp form), is:

$$S(\underline{z},\tau,\gamma)_{nl}=\exp(-j\omega_n D_k(\underline{z}))\, R_{kn}(D_k(\underline{z})+\tau+\gamma t_n, \theta). \quad \text{(EQ. 20)}$$

The objective function can optionally and preferably be defined as the highest eigenvalue of the multiplication of the matrix S by its Hermitian conjugate $S^H$. Formally, the objective function can be written as:

$$C(\{v\})=\|S^H S\|. \quad \text{(EQ. 21)}$$

where $\{v\}$ denotes the set of optimization variables used to define the matrix S. When a digital terrain map is employed, the set $\{v\}$ includes two components of z and one or more elements of the set $\{\tau, \Omega, \gamma, \theta\}$. When a digital terrain map is not employed, the set $\{v\}$ includes three components of z and one or more elements of the set $\{\tau, \Omega, \gamma, \theta\}$.

The location vector z (or components thereof) is optionally and preferably estimated by maximization of the objective function C over the set $\{v\}$. This can be done, for example, by coarse grid search over the relevant domains of the variables in $\{v\}$, followed by an iterative maximization algorithm such as, but not limited to, the Nelder-Mead simplex method for fine maximum computation, as described, e.g., in Press, William and Flannery, Brian, *Numerical Receipes in C*. Cambridge University Press 1988 p. 305-309.

Stations 16 can be deployed in any spatial arrangement. Preferably, the stations are deployed such as to achieve high received power and a variety of reception directions. For example, if the purpose of a system is to locate sources confined to an area which has a square shape, then it is preferred to deploy the stations so they are evenly distributed along the perimeter of this square, and to deploy a reference transmitter in the center of the square area.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for estimating a location of a source transmitting a spectral-diversity signal having a known form but at least one unknown parameter, the system comprising:
   a plurality of deployed signal receiving circuits, each having:
   a representation generating circuit configured to receive the spectral-diversity signal and to generate a signal representation for each signal carrier component in the spectral-diversity signal, and
   a digital signal processing circuit configured to access a memory medium storing the known form, to compute a cross-ambiguity function based on said known form provided by said memory medium and on said signal representation provided by said representation generating circuit ; and
   a central processor circuit remote to at least one of said deployed signal receiving circuits and configured to receive from each signal receiving circuit data pertaining to a respective cross-ambiguity function, and to estimate the location of the source, wherein said estimation comprises calculating an extremum of an objective function constructed from all said cross-ambiguity functions;
   wherein said estimation is an indirect estimation, wherein said said central processor circuit is configured to calculate, based on said extremum, TDOA values between pairs of signal receiving circuits, and to estimate the location based on said TDOA values, and wherein for each pair of signal receiving circuits, said objective function comprises a matrix having an entry for each of cross-ambiguity function as computed by each signal receiving circuit of the pair.

2. The system according to claim 1, further comprising a reference source transmitting a reference spectral-diversity signal, wherein each signal receiving circuit is configured to compute a cross-ambiguity function corresponding to signal carrier components in said reference spectral-diversity signal, and wherein central processor circuit is configured to correct a timing offset among said signal receiving circuits based on said cross-ambiguity function.

3. The system according to claim 1, wherein said central processor circuit is configured to access a database storing a digital terrain map describing height data of sources and to extract from said map a height of said source, and wherein said estimation based on said extremum is executed in two spatial dimensions and combined with said extracted height.

4. The system according to claim 1, wherein said at least one unknown parameter comprises a phase of each signal carrier component.

5. The system according to claim 1, wherein said at least one unknown parameter comprises amplitude of each signal carrier component.

6. The system according to claim 1, wherein said at least one unknown parameter comprises a clock drift characterizing the source.

7. The system according to claim 1, wherein said at least one unknown parameter comprises a phase of each signal carrier component, amplitude of each signal carrier component, and at least one additional parameter other than said phase and said amplitude.

8. The system according to claim 1, wherein said known form comprises a linear chirp form.

9. A method of estimating a location of a source transmitting a spectral-diversity signal having a known form but at least one unknown parameter, the method comprising:
   receiving the spectral-diversity signal by a plurality of deployed signal receiving circuits each having a representation generating circuit and a digital signal processing circuit;
   at each signal receiving circuit:
   by said representation circuit, generating a signal representation for each signal carrier component in the spectral-diversity signal; and
   by said digital signal processing circuit, accessing a memory medium storing the known form, computing, for each signal carrier component of the spectral-diversity signal a cross-ambiguity function based on said known form provided by said memory medium and on said signal representation provided by said representation generating circuit; and
   by a central processor circuit remote to at least one of said deployed signal receiving circuits, receiving from each signal receiving circuit data pertaining to a respective cross-ambiguity function, and estimating the location of the source, wherein said estimation comprises calculating an extremum of an objective function constructed from all said cross-ambiguity functions;
   wherein said estimation is an indirect estimation, which comprises calculating, based on said extremum, TDOA values between pairs of signal receiving circuits, and estimating the location based on said TDOA values; and wherein for each pair of signal receiving circuits, said objective function comprises a multiplication of N by 2 matrices, each being constructed from a first plurality of cross-ambiguity functions corresponding to a first signal receiving circuit of said pair and a second plurality of cross-ambiguity functions corresponding to a second signal receiving circuit of said pair, wherein said N is a number of said signal carrier components.

10. The method according to claim 9, further comprising transmitting a reference spectral-diversity signal, computing a cross-ambiguity function corresponding to signal carrier components in said reference spectral-diversity signal, and correcting a timing offset among said signal receiving circuits based on said cross-ambiguity function.

11. The method according to claim 9, further comprising accessing a database storing a digital terrain map describing height data of sources and extracting from said map a height of said source, wherein said estimation based on said extremum is executed in two spatial dimensions and combined with said extracted height.

12. The method according to claim 9, wherein said at least one unknown parameter comprises a phase of each signal carrier component.

13. The method according to claim 9, wherein said at least one unknown parameter comprises amplitude of each signal carrier component.

14. The method according to claim 9, wherein said at least one unknown parameter comprises a clock drift characterizing the source.

15. The method according to claim 9, wherein said at least one unknown parameter comprises a phase of each signal carrier component, amplitude of each signal carrier component, and at least one additional parameter other than said phase and said amplitude.

16. The method according to claim 9, wherein said known form comprises a linear chirp form.

17. The system according to claim 7, wherein said at least one additional parameter comprises a clock drift characterizing the source.

18. The method according to claim 9, wherein said at least one additional parameter comprises a clock drift characterizing the source.

19. A system for estimating a location of a source transmitting a spectral-diversity signal having a known form but at least one unknown parameter, the system comprising:

a plurality of deployed signal receiving circuits, each having:

a representation generating circuit configured to receive the spectral-diversity signal and to generate a signal representation for each signal carrier component in the spectral-diversity signal, and a digital signal processing circuit configured to access a memory medium storing the known form, to compute a cross-ambiguity function based on said known form provided by said memory medium and on said signal representation provided by said representation generating circuit; and a central processor circuit remote to at least one of said deployed signal receiving circuits and configured to receive from each signal receiving circuit data pertaining to a respective cross-ambiguity function, and to estimate the location of the source, wherein said estimation comprises calculating an extremum of an objective function constructed from all said cross-ambiguity functions;

wherein said estimation is a direct estimation, wherein said said central processor circuit is configured to estimate the location directly from said extremum, and wherein said objective function comprises a multiplication of N by K matrices, each being constructed from K pluralities of cross-ambiguity functions respectively corresponding to K signal receiving circuits, wherein said N is a number of said signal carrier components.

20. A method of estimating a location of a source transmitting a spectral-diversity signal having a known form but at least one unknown parameter, the method comprising:

receiving the spectral-diversity signal by a plurality of deployed signal receiving circuits each having a representation generating circuit and a digital signal processing circuit;

at each signal receiving circuit:

by said representation circuit, generating a signal representation for each signal carrier component in the spectral-diversity signal; and by said digital signal processing circuit, accessing a memory medium storing the known form, computing, for each signal carrier component of the spectral-diversity signal a cross-ambiguity function based on said known form provided by said memory medium and on said signal representation provided by said representation generating circuit; and by a central processor circuit remote to at least one of said deployed signal receiving circuits, receiving from each signal receiving circuit data pertaining to a respective cross-ambiguity function, and estimating the location of the source, wherein said estimation comprises calculating an extremum of an objective function constructed from all said cross-ambiguity functions;

wherein said estimation is executed directly from said extremum, and wherein said objective function comprises a multiplication of N by K matrices, each being constructed from K pluralities of cross-ambiguity functions respectively corresponding to K signal receiving circuits, wherein said N is a number of said signal carrier components.

* * * * *